(12) United States Patent
Abe et al.

(10) Patent No.: US 9,140,716 B2
(45) Date of Patent: Sep. 22, 2015

(54) DISPLAY SYSTEM FOR VEHICLE AND VEHICLE

(75) Inventors: Takeo Abe, Suita (JP); Aki Miake, Nara (JP); Takeshi Yamamoto, Soraku-gun (JP); Toshiya Takahashi, Soraku-gun (JP); Shinichirou Ota, Nara (JP); Megumi Itoh, Nara (JP); Koji Sato, Kashiwara (JP); Mika Akada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1661 days.

(21) Appl. No.: 11/570,094

(22) PCT Filed: Jun. 6, 2005

(86) PCT No.: PCT/JP2005/010733
§ 371 (c)(1),
(2), (4) Date: Dec. 6, 2006

(87) PCT Pub. No.: WO2005/120882
PCT Pub. Date: Dec. 22, 2005

(65) Prior Publication Data
US 2007/0182537 A1   Aug. 9, 2007

(30) Foreign Application Priority Data
Jun. 7, 2004   (JP) ................... 2004-169162

(51) Int. Cl.
*B60Q 1/00*    (2006.01)
*G01P 1/08*    (2006.01)
*B60K 37/02*   (2006.01)

(52) U.S. Cl.
CPC .. *G01P 1/08* (2013.01); *B60K 37/02* (2013.01)

(58) Field of Classification Search
CPC ................................. G01P 1/08; B60K 37/02
USPC ...................... 340/438, 815, 462, 441, 995.1
See application file for complete search history.

(56) References Cited

U.S. PATENT DOCUMENTS 5,136,516 A * 8/1992 Twombly ...................... 701/20
5,166,610 A * 11/1992 Bezos et al. ................. 324/160

(Continued)

FOREIGN PATENT DOCUMENTS

JP  06-262964 A  9/1994
JP  08-113060 A  5/1996

(Continued)

OTHER PUBLICATIONS

Official communication issued in the corresponding International Application No. PCT/JP2005/010733, mailed on Sep. 20, 2005.

*Primary Examiner* — Kerri McNally
(74) *Attorney, Agent, or Firm* — Keating & Bennett, LLP

(57) ABSTRACT

A display system of the present invention for a vehicle includes plural speed display areas which are capable of being simultaneously displayed, such as a first speed display area and a second speed display area, and a display controlling section causing predetermined one of speed display areas to display speed and for causing other one or more of speed display areas to display information other than speed according to necessity. This allows decrease in false recognition of the speed. With this, a display system for a vehicle can be provided, the display system being able to improve safety of driving by a user by getting rid of false recognition of speed, which is important information for safe driving.

19 Claims, 10 Drawing Sheets

(56) References Cited

U.S. PATENT DOCUMENTS

| | | | |
|---|---|---|---|
| 5,376,917 A | | 12/1994 | Yoshimoto et al. |
| 5,673,987 A | * | 10/1997 | Futschik et al. ............... 362/23 |
| 5,732,368 A | | 3/1998 | Knoll et al. |
| 5,764,139 A | * | 6/1998 | Nojima et al. ............... 340/461 |
| 6,285,778 B1 | * | 9/2001 | Nakajima et al. ............. 382/104 |
| 6,538,622 B1 | * | 3/2003 | Kojima et al. .................... 345/7 |
| 6,593,960 B1 | * | 7/2003 | Sugimoto et al. ............. 348/148 |
| 6,778,074 B1 | * | 8/2004 | Cuozzo ........................ 340/441 |
| 2002/0123829 A1 | * | 9/2002 | Kuriya et al. ..................... 701/1 |
| 2003/0214603 A1 | | 11/2003 | Manning |
| 2005/0163318 A1 | | 7/2005 | Duffield et al. |

FOREIGN PATENT DOCUMENTS

| | | |
|---|---|---|
| JP | 09-123848 A | 5/1997 |
| JP | 10-6810 A | 1/1998 |
| JP | 2001-113981 A | 4/2001 |
| JP | 2002-323512 A | 11/2002 |
| JP | 2003-102002 A | 4/2003 |
| JP | 2003-212000 A | 7/2003 |
| JP | 2003-237504 A | 8/2003 |
| JP | 2004-093167 A | 3/2004 |
| JP | 2004-145660 A | 5/2004 |
| JP | 2005-526467 A | 9/2005 |
| WO | 01/60650 A1 | 8/2001 |

* cited by examiner

SPEED 0, STEERING ANGLE 0°

SPEED 0, STEERING ANGLE 30° TO RIGHT

SPEED 30Km/h, STEERING ANGLE 0°

SPEED 30Km/h, STEERING ANGLE 30° TO RIGHT

SPEED 90Km/h, STEERING ANGLE 0°

SPEED 90Km/h, STEERING ANGLE 30° TO RIGHT

NORMAL DISPLAY

TRUNK DISPLAY

NORMAL DISPLAY

SHOW-ALL DISPLAY

DISPLAY SYSTEM FOR VEHICLE AND VEHICLE

BACKGROUND OF THE INVENTION

1. Field of the Invention

The present invention relates to a display system for a vehicle, and to a vehicle provided with the display system. The display system displays, as an additional image, information for supporting driving, such as a state of the vehicle (such as speed of the vehicle, engine speed of an engine), a navigation image, and/or the like.

2. Description of the Related Art

In recent years, a known document 1 (Japanese Laid-Open Patent Publication No. 123848/1997 (published on May 13, 1997)) discloses an onboard display system for an instrument cluster panel of an automobile. This onboard display system displays, as an additional image, information for supporting drive such as a navigation image, in addition to vehicle state information such as speed of the vehicle, engine speed of an engine, and/or the like.

The onboard information display device disclosed in the document 1 displays navigation, a back monitoring image (an image of a posterior image seen from a vehicle; this image is captured by using an onboard camera, and outputted to and displayed on the display device), a television screen, and an operation screen for audio.

However, the onboard information display device weights images for display according to the condition of the vehicle and changes display according to the result of weighting. Therefore a display position of speed display changes frequently according to the condition. As a result, a user must look for speed display every time the driving condition changes. That is, the user may make false recognition of speed that is important information for driving safely.

This brings a problem that the more the amount of information displayed on the same display area of a display device becomes, the higher the ratio of the user making false recognition of speed becomes, and the lower the safety of the user's driving becomes.

SUMMARY OF THE INVENTION

An object of the present invention is to provide a display system for a vehicle, and a vehicle provided with the display system. The display system of the present invention prevents false recognition of speed that is important information for safe driving, and allows a user to more easily look and recognize the speed, thereby improving safety of user's driving.

A display system according the present invention for a vehicle is provided with a display device having plural speed display areas, which are capable of being caused to display simultaneously; and a display controlling device for causing predetermined one of the plural speed display areas to display speed and causing other one or more of the plural speed display areas to display information other than the speed according to necessity.

In the structure, when the display device has the plural speed display areas, which can be displayed simultaneously, the speed is displayed on the predetermined one of the speed value display areas. This allows a user to recognize the speed with sure, even if the information other than speed is displayed on other one or more of the speed display areas.

As a result, the false recognition of speed that is important information for safe driving is decreased and user's visibility of the speed and safety of user's driving are improved.

Further, a display system according to the present invention for a vehicle includes a display device having plural speed display areas, which are capable of being caused to display simultaneously; and a display controlling device for causing at least two of the plural speed display areas to display speed and for causing other one or more of the plural speed display areas to display information other than the speed according to necessity.

In the structure, when the display device has the plural speed display areas, which are capable of being displayed simultaneously, the speed is displayed on the two of the speed display areas. This allows a user to look and recognize the speed with sure, even if the information other than speed is displayed on the other one or more of the speed display areas.

Because the speed is displayed on two speed display areas as described above, the false recognition of speed that is important information for safe driving can be further reduced, thereby improving user's visibility of the speed and safety of user's driving.

Further, a display system according to the present invention for a vehicle includes a display device having plural speed display areas, which are capable of being caused to display simultaneously; a display controlling device for causing always same one of the plural speed display areas to display speed when the display device is displaying the speed, and for causing other one or more of the plural speed display areas to display information other than the speed according to necessity.

In the structure, when the display device has the plural speed display areas, which are capable of being displayed simultaneously, the speed is displayed on always the same one of the speed display area when the display device is displaying the speed. This allows a user to look and recognize the speed with sure, even if the information other than speed is displayed on the other one or more of the speed display areas.

Because as described above, the speed is displayed always the same one of the speed display areas when the display device is displaying, the false recognition of speed that is important information for safe driving can be prevented, thereby improving user's visibility of the speed and safety of user's driving.

The display controlling device preferably displays speed digitally, when the speed and information other than speed are displayed respectively on the predetermined one, at least two, or same one and the other one or more of the speed display areas.

By displaying speed digitally as described above, it becomes possible to cause the user to look and recognize the speed by using a smaller display area than the case where speed is displayed by using a meter. Namely, it becomes possible to further minify display dimensions of the speed display area for displaying speed.

With this arrangement, it becomes possible to further enlarge a display area of the speed display area for displaying information other than speed.

Further, the above mentioned display system may be arranged such that when the speed and information other than speed are displayed respectively on the predetermined one, at least two, or same one and the other one or more of the speed display areas, the other one or more of the speed display areas is larger than the predetermined one, at least two, or same one of the speed display areas.

In this case, it becomes easy for the user to look and recognize the information other than the speed displayed on the other one or more of the speed display areas.

Examples of the information other than the speed is as follows; an image from a navigation device, a captured image from a camera disposed in the vehicle, an image from a storage medium included in the vehicle, an image which is stored in another storage medium and is outputted by a reproducing device included in the vehicle, the reproducing device reproducing the image from the another storage medium, an image for operation of an acoustic device included in the vehicle, an image for operation of an air-conditioning apparatus included in the vehicle, and an image received by a TV receiver. The above structures may be such that at least one of these images is displayed on the speed display area for displaying the information other than the speed.

The display system with any one of the structures may be adapted so that it further includes: a speed detection section for detecting the speed of the vehicle; a steering angle detection section for detecting steering angle of the vehicle; and a background image storage section for storing therein a background image that is to be displayed on the speed display area, the display controlling device (i) reading out the background image from the background image storage section, (ii) causing the display device to display the background image, and (iii) scrolling the background image according to the speed detected by the speed detection section and to the steering angle detected by the steering angle detection section.

With this arrangement, the background image scrolling according to the speed and the direction of the steering allows a driver of the vehicle to sensibly comprehend the speed and the direction of the steering.

The display system with any one of the structures may be adapted so that it further includes: a speed detection section for detecting the speed of the vehicle; and a steering angle detection section for detecting steering angle of the vehicle, the display system performing the display in such a manner that, when an image displayed as the information other than speed is a front image being captured in a front area seen from the vehicle, the display controlling device moves a central position of the front image according to the steering angle detected by the steering angle detection section, and decides scroll speed of the front image according to the speed detected by the speed detection section.

In this case, the image displayed on the display device, namely, the front image seen from the vehicle is manipulated in response to the speed and steering angle of the vehicle, and thereby discomfort feeling about a display image in traveling of the vehicle can be decreased.

Further, the display system with any one of the structures may be adapted so that it includes: a front camera for capturing an image of a front area seen from the vehicle; and a human body detection section for detecting a human body in an image-capturing range of the front camera, the display system performing the display in such a manner that, if an image displayed as the information other than speed is a front image captured by the front camera, the display controlling device causes the detected human body to be displayed with emphasis when the human body detection section detects the human body in the front image.

In this case, when the image displayed on the display device, namely, the front image seen from the vehicle includes a human body, the human body is displayed with emphasis, allowing the user to recognize the human body with sure.

As the human body detection section, a section for detecting a human body by detecting heat of a photographic subject in an image-capturing range of the front camera is preferable. An example of this human body detection section is an infrared sensor.

Further, as the human body detection section, a human body detection section for detecting a human body by use of outline information included in the front image captured by the front camera is preferable.

Further, the display system may be adapted so that it includes, in a case of the vehicle being a automobile, at least one of an in-vehicle camera for capturing an image of an inside of an automobile and a trunk camera for capturing an image of an inside of a trunk of the automobile, the display system performing the display in such a manner that, the display controlling device displays, as the information other than speed, the image or images on the other one or more of the speed display areas for displaying information other than speed, the image or images captured by the in-vehicle camera and/or trunk camera.

In this case, when the automobile is stopping or traveling, the driver can check the automobile interior and/or the trunk without looking back the direction he wants to see.

Further, it is preferable that a plurality of the in-vehicle cameras and/or the trunk cameras be provided. With this arrangement, an image-capturing range of the automobile interior and the trunk can be enlarged. Further, in addition to this, the display device may be arranged to simultaneously display all of the images captured by the plurality of the in-vehicle cameras and/or the trunk cameras. With this, the plurality of the image-capturing ranges can be checked simultaneously, and thereby a sought subject can easily be sought out.

Further, it is preferable that when the display controlling device causes the other one or more of the speed display areas to display, as the information other than speed, the image(s) captured by the in-vehicle camera(s) and/or the trunk camera(s), the display controlling device displays information including a figure schematically indicating a position(s), an image(s) of which the in-vehicle camera(s) and/or the trunk camera(s) capture(s). With this arrangement, it becomes easy for the driver to comprehend which position is being image-captured and comprehend conditions of the position.

The other one or more of the speed display areas are preferably oblong, with their aspect ratios being 7:3 or more, the aspect ratios being a width/height ratio of a display area.

With this arrangement, in which the other one or more of the speed display areas are oblong, the information other than the speed is more plentifully displayed. Particularly, when the front image is displayed, the driver can check a wider range, with a result that he can surely recognize a crossing pedestrian.

DETAILED DESCRIPTION OF PREFERRED EMBODIMENTS

An embodiment of the present invention will be explained below.

In the present embodiment, an example in which a display system of the present invention for a vehicle is employed in an automobile is explained.

Figure 1:
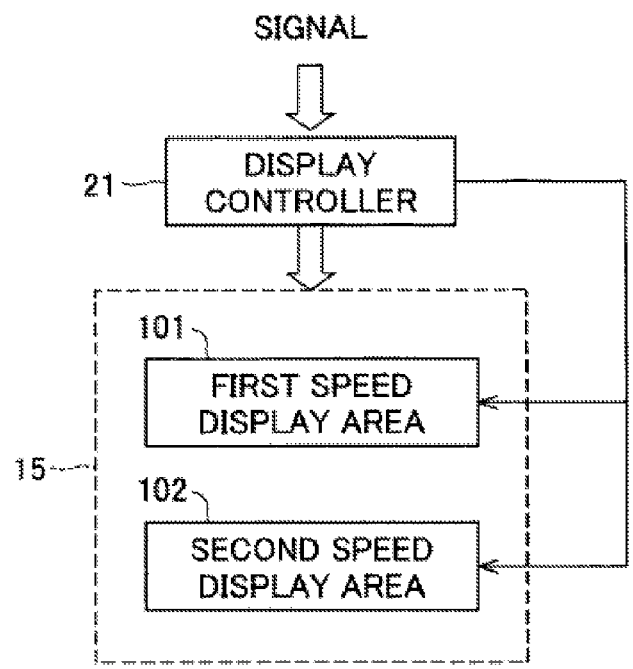
FIG. 1 is a block diagram of an embodiment of the present invention, schematically illustrating an arrangement of a display system for a vehicle.

As illustrated in FIG. 1, the display system for a vehicle relating to the present invention includes a display section 15 as a display device used for an instrument cluster panel of the automobile and a display controller 21 as a display controlling device for controlling display of the display section 15 according to an input signal (such as a display signal and a display controlling signal).

Figure 2A:
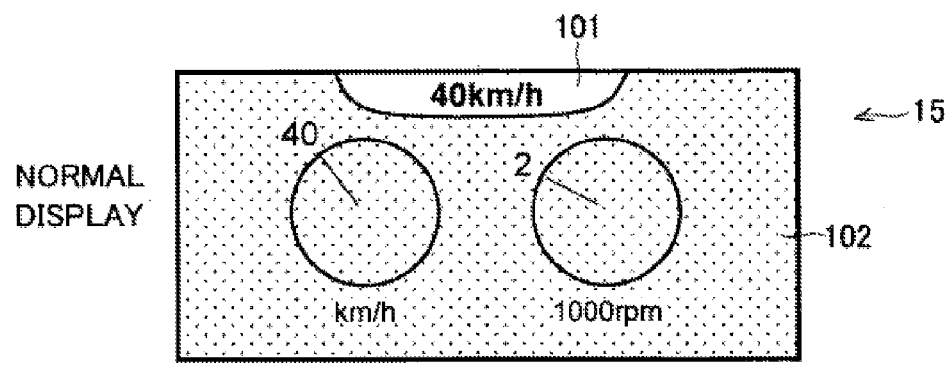
FIG. 2 illustrates an example of display in a display section illustrated in FIG. 1, and (a) is a view illustrating an example of display in a normal display mode and (b) is a view illustrating an example of display in a navigation display mode.
Figure 2B:
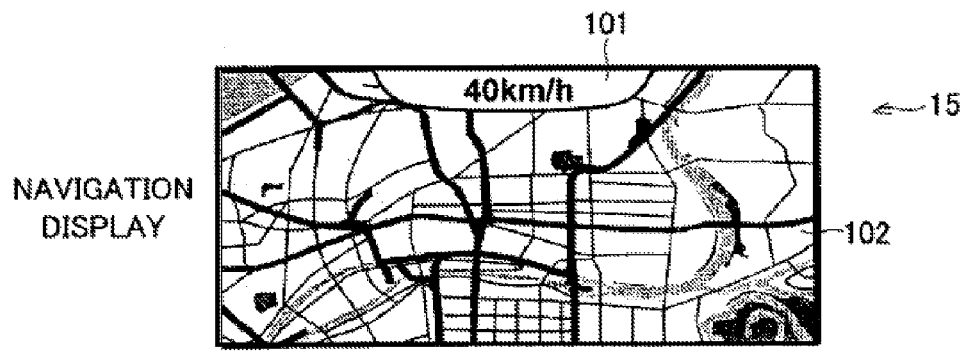

The display section 15 is provided with a first speed display area 101 and a second speed display area 102, which act as speed display areas for displaying the speed of the automobile. As illustrated in FIGS. 2 (a) and 2 (b), information displayed on these two speed display areas are changed over according to necessity.

FIG. 2 (a) illustrates a normal display mode in which a speed display with numerical values is carried out in the first speed display area 101 and a speed display or an engine speed display graphically, for example, as a circular meter is carried out in the second speed display area 102. Further, FIG. 2 (b) is a navigation display mode in which a speed display with numerical values is carried out in the first speed display area 101 and a navigation image display is carried out in the second speed display area 102.

It is preferable that the first speed display area 101 always display the speed, and it is preferable that the second display area 102 have a larger display area than the first display area 101.

Further, the second speed display area 102 may display not only the navigation image, but also an image described later, such as a camera image illustrating an inside of the automobile, a detection image of a human body crossing a road, or other images.

Further, the second speed display area 102 may display an image such as: an image outputted from a storage medium included in the automobile as a vehicle; an image stored in other storage medium and outputted by a reproducing device reproducing the image from the other storage medium; an image for operation of an acoustic device mounted in the automobile; an image for operation of an air-conditioning apparatus mounted on the automobile or an image received via a television receiver.

Figure 3:
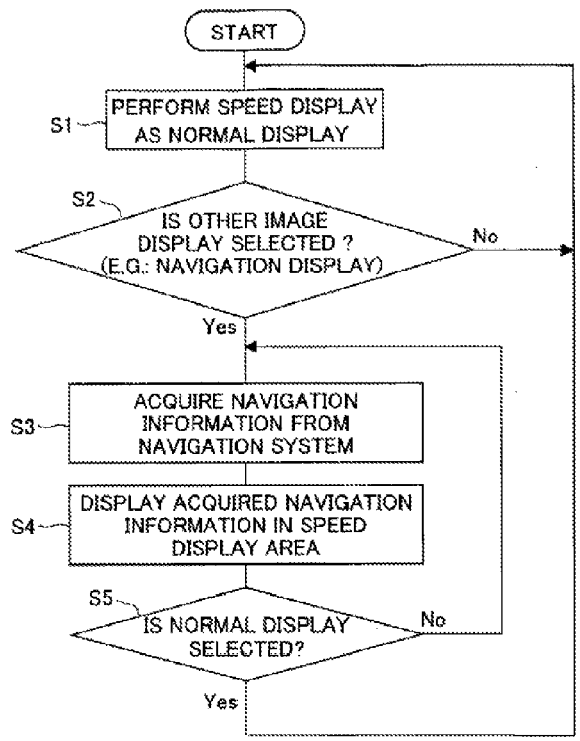
FIG. 3 is a flowchart illustrating a flow of a switching process of display modes in the display system illustrated in FIG. 1.

The flow of a display process of the display system for a vehicle, described in FIG. 1, will be explained below with reference to the flowchart described in FIG. 3. A process for controlling display of the display section 15 by the display controller 21 will be explained here.

First, as illustrated in FIG. 2 (a), the display controller 21 controls the display section 15 to perform a normal speed display in which the speed is displayed both in the first speed display area 101 and in the second speed display area 102 (step S1).

And the display controller 21 judges whether other image display mode is selected or not (step S2). Here, the display controller 21 judges according to whether a selection signal is inputted to the display controller 21 from a display mode selecting section (such as a display mode selecting switch; not shown in the figure) as a result of operation of the display mode selecting section.

In the step S2, when the display controller 21 judges that other image display mode is selected, the controller 21 acquires navigation information from a later mentioned navigation system 14 (see FIG. 4) (step S3), and causes the display section 15 to display the acquired navigation information in the second speed display area 102 (step S4).

Next, the display controller 21 judges whether the normal display mode is selected or not (step S5), and continues to display navigation information, namely, to maintain a navigation display mode in the second speed display area 102 of the display section 15 until the normal display mode is selected.

In this example, the case where navigation information is displayed on the second speed display area 102 is explained, but the process is not limited to this example. The process may display, where appropriate, information that is likely to be necessary for traveling of the automobile. The display system for a vehicle will be explained below more specifically.

Figure 4:
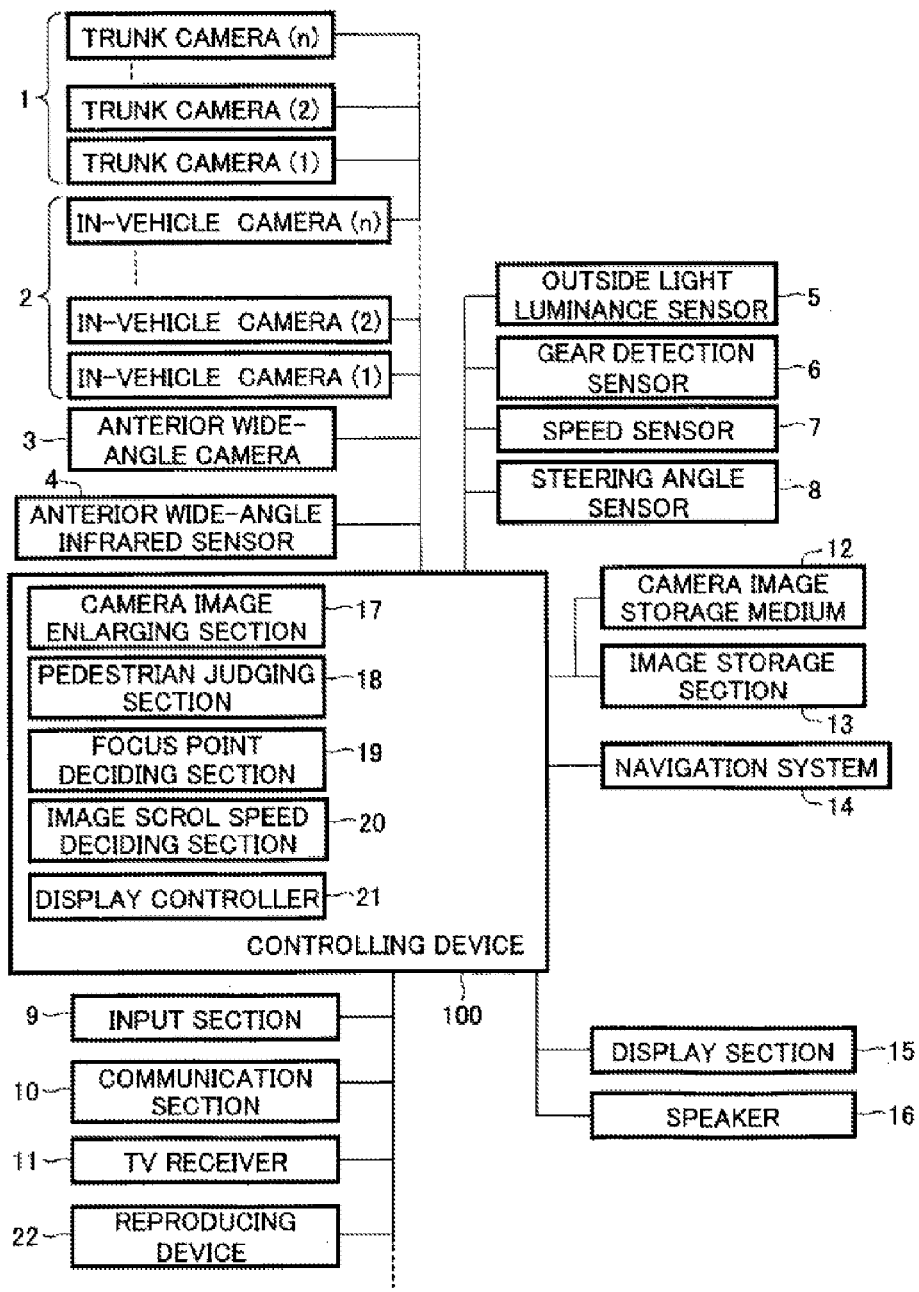
FIG. 4 is a block diagram schematically illustrating a structure of a whole system of the display system for a vehicle shown in FIG. 1.

As illustrated in FIG. 4, the display system according to the present invention for a vehicle includes: a main controller 100 for controlling the whole system; a variety of cameras such as a plurality of trunk cameras 1, a plurality of in-vehicle cameras 2 and an anterior wide-angle camera 3; a variety of sensors such as an anterior wide-angle infrared sensor 4, an outside light luminance sensor 5, a gear detection sensor 6, a speed sensor 7 and a steering angle sensor 8; input means such as an input section 9, a communication section 10, a TV receiver 11 and a reproducing device 22; storage means such as a camera image storage section 12 and an image storage section 13; a navigation system 14; a display section 15; and a speaker 16.

The trunk camera 1 is for capturing an image of an inside of a trunk of the automobile, and the number of the trunk camera 1 may be one or more than one. A wider area of the truck can be dealt with (image-captured) by using the more than one trunk camera 1, than by using the one trunk camera 1. Namely, the number of the trunk camera 1 may be determined considering the size of the trunk and how much area can be dealt with by using one trunk camera 1 solely. In the present embodiment, the number of the trunk camera 1 is put as n (n is an integral number: n≥1).

The in-vehicle camera 2 is for capturing an image of an inside of the automobile, and the number of the in-vehicle camera 2 to be provided may be one or more than one. In this case as well as the trunk camera 1, the number of the in-vehicle camera 2 may be determined considering a size of the inside of the automobile and how much area can be dealt with by using the in-vehicle camera 2 solely. In the present embodiment, the number of the in-camera camera 2 is put as n (n is an integral number: n≥1).

Further, the anterior wide-angle camera 3 is disposed in an anterior part of a body of the automobile, and used for capturing an image of an area in front of the automobile.

Further, the anterior wide-angle infrared sensor 4 is disposed in the anterior part of the body of the automobile, and used for detecting infrared ray with the same wide-angle range as the anterior wide-angle camera 3. Namely, the anterior wide-angle infrared sensor 4 functions as human body detecting means for detecting heat of a photographic subject in the image-capturing range of the anterior wide-angle camera 3 so as to detect a human body (such as a pedestrian).

The camera images captured by the trunk camera 1, the in-vehicle camera 2, and the anterior wide-angle camera 3 are stored in the camera image storage section 12 through the controlling device 100.

On the other hand, a detection signal from the anterior wide-angle infrared sensor 4 is sent to the controlling device 100.

Further, in addition to the camera image storage section 12, the present system includes the image storage section 13 (background image storage means), and the image storage section 13 stores therein images such as map data used for the navigation system 14 and a background image that is to be displayed on the speed display area.

Further, in addition to the display section 15, the present system includes the speaker 16 for outputting sounds, the input section 9 (such as a variety of keys) for operating the navigation system 14, the communication section 10 for receiving or transmitting information such as navigation, and the TV receiver 11.

In addition to the anterior wide-angle infrared sensor 4, the present system includes the outside light luminance sensor 5, the gear detection sensor 6, the speed sensor 7 and the steering angle sensor 8. Signals detected by the sensors are respectively sent to the controlling device 100 and used for a variety of controlling.

In addition to the display controlling section 21 for controlling the display of the display section 15, the controlling device 100 includes a camera image enlarging section 17, a pedestrian judging section 18, a focus point deciding section 19 and an image scroll speed deciding section 20.

The pedestrian judging section 18 judges whether a pedestrian exists or not in the image-capturing range of the wide-angle camera 3, on the basis of a detection signal from the anterior wide-angle camera 3 or from the anterior wide-angle infrared sensor 4. The subject to be judged may include small animals such as dogs. The process is fully explained later.

The camera image enlarging section 17 carries out an enlarging process for enlarging a camera image captured by the trunk camera 1, the in-vehicle camera 2, or the anterior wide-angle camera 3. When the image of the trunk camera 1 and the in-vehicle camera 2 is displayed on the display section 15, the enlarging process is carried out according to instructions from an operator via the input section 9. When the image of the anterior wide-angle camera 3 is displayed on the display section 15, the enlarging process is carried out not only according to the instructions from the operator via the input section 9, but also according to the result of detection of the speed sensor 7 (speed of the automobile).

The focus point deciding section 19 decides a focus position on the display screen according to the result of detection of the steering angle sensor 8 (a steering angle), when the image on the displaying section 15 is that of the anterior wide-angle camera 3 or when the background image is displayed on the second speed display area 102 in the normal display mode.

The image scroll speed deciding section 20 decides scroll speed of the image according to the result of detection of the speed sensor 7 (speed of the automobile), when the image on the display section 15 is that of the anterior wide-angle camera 3 or when the background image is displayed on the second speed display area 102 in the normal display mode.

Figure 5:
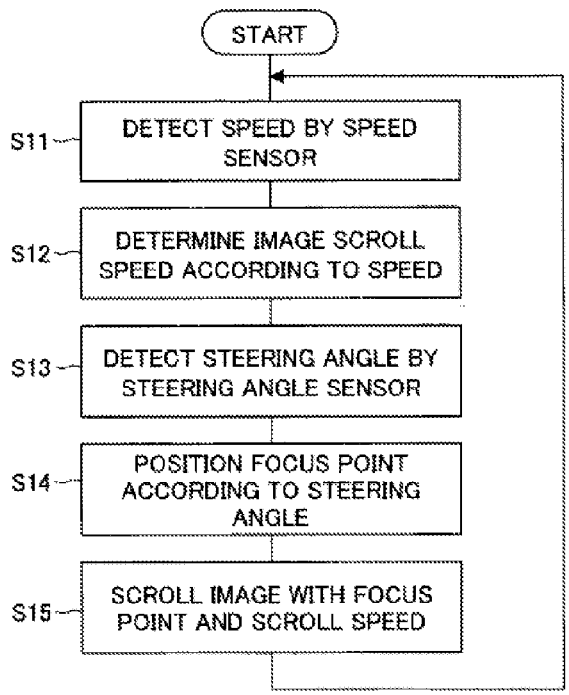
FIG. 5 illustrates an embodiment of the present invention, and is a flow chart illustrating a flow of a display process in a case where information other than navigation is displayed on a second speed display area.
Figure 6A:
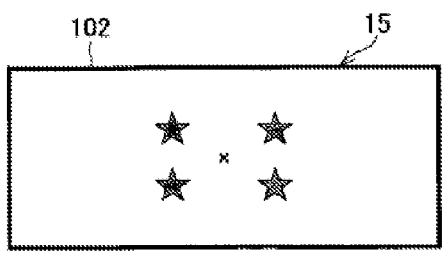
FIGS. 6 (a) and (b) are views illustrating examples of display by the display process described in FIG. 5.
Figure 6B:
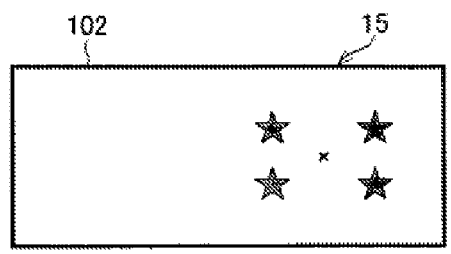

With reference to FIG. 5 and FIGS. 6 (*a*) and 6 (*b*) through FIGS. 8 (*a*) and 8 (*b*), a flow of the process in the display system with the structure is explained below. This process is a process carried out in the case where the image of the anterior wide-angle camera 3 is displayed on the display section 15 inside the automobile while the automobile travels, or in the case where the background image is displayed on the second speed display area 102 in the normal display mode. Display images illustrated in FIG. 6 (*a*) (*b*) through FIG. 8 (*a*) (*b*) are display images displayed on the second speed display area 102 of the display section 15.

First, the speed is detected by the speed sensor 7 (step S11). The image scroll speed deciding section 20 decides image scroll speed according to the speed. (step S12).

Next, a steering angle is detected by the steering angle sensor 8 (step S 13). The focus point deciding section 19 decides a focus position according to the steering angle (step S 14).

Finally, the display controller 21 displays an asked image on the display section 15 in such a manner that the image is displayed referring to the decided focus position and scrolled at the decided scroll speed (step S15).

Here, examples of display on the display section 15 are explained. For example, when the speed of the automobile is 0 Km/h and the steering angle of the automobile is 0°, the image is one illustrated in FIG. 6 (*a*). In FIG. 6 (*a*), "x" indicating the focus position and the "filled star sign" indicating the photographic subject are situated in a center portion of the display screen. When the steering angle becomes 30° to the right in this condition, the photographic subject and focus position moves to the right side of the display screen of the display section 15, as illustrated in FIG. 6 (*b*).

Figure 7A:
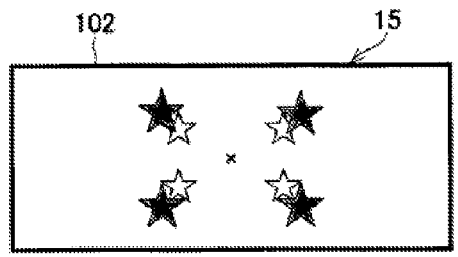
FIGS. 7 (a) and (b) are views illustrating examples of display by the display process described in FIG. 5.
Figure 7B:
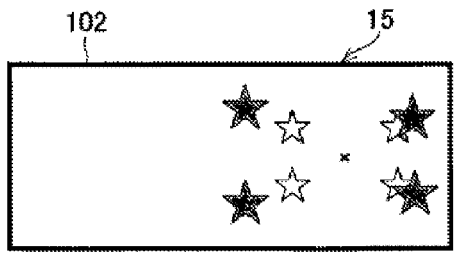

Further, when the speed of the automobile is 30 Km/h and the steering angle of the automobile is 0°, the image is one illustrated in FIG. 7 (*a*). In FIG. 7 (*a*), the display screen is scrolled so that the photographic subject is in the center portion of the display screen of the display section 15 and at the same time is getting closer to the automobile in a front direction. The scroll speed of the screen in this case is decided according to the speed of the automobile. When the steering angle becomes 30° to the right in this condition, the photographic subject and focus position moves to the right side of the display screen of the display section 15, as illustrated in FIG. 7 (*b*). The display screen in this case is scrolled according to the speed of the automobile, too.

Figure 8A:
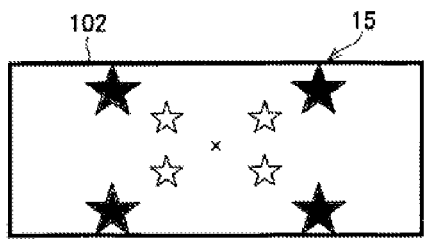
FIGS. 8 (a) and (b) are views illustrating examples of display by the display process described in FIG. 5.
Figure 8B:
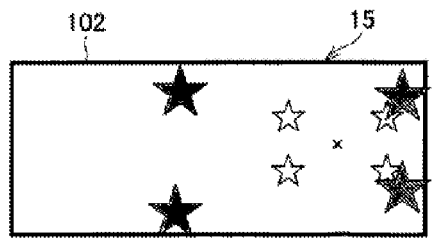

Further, when the speed of the automobile is 90 Km/h and steering angle of the automobile is 0°, the image is one illustrated in FIG. 8 (*a*). Namely, FIG. 8 (*a*) illustrates that the scroll speed of the display screen is faster than the scroll speed when speed of the automobile is 30 Km/h as illustrated in FIG. 7 (*a*). And when the steering angle becomes 30° to the right in this condition, the photographic subject and focus position moves to the right side of the display screen of the display section 15, as illustrated in FIG. 8 (*b*). The display screen in this case is scrolled faster than the scroll speed illustrated in FIG. 7 (*b*), too.

In this arrangement, as described above, the display state of the photographic subject is changed according to the speed of the automobile or the steering angle, in the case where an image of the anterior wide-angle camera 3 is displayed on the second speed display area 102 of the display section 15, or in the case where the background image is displayed on the second speed display area 102 in the normal display mode. With this arrangement, the image of the anterior wide-angle camera 3 can be displayed in conformity with the actual drive feeling. In a case where the background image is displayed on the second speed display area 102 in the normal display mode, a driver of the vehicle can sensibly comprehend the speed and the direction of steering because the background image scrolls according to the speed and the direction of steering. As a result, the operator (the driver) seeing the second speed display area 102 of the display section 15 can comprehend with precision the driving situation from the image displayed on the display screen, so that safety of driving improves.

Further, the present display system for the vehicle can improve the safety of driving by detecting a crossing pedestrian and displaying a warning display, while the anterior wide-angle image is displayed on the second speed display area 102 of the display section 15. The display mode on the display section 15 in this case is called a pedestrian warning display mode hereinafter. Selection of the pedestrian warning display mode is carried out through operating the input section 9 as input means. In addition to this operation, switching to the pedestrian warning display mode is carried out automatically according to a detection result detected by the gear detection sensor 6 or the speed sensor 7.

Figure 9:
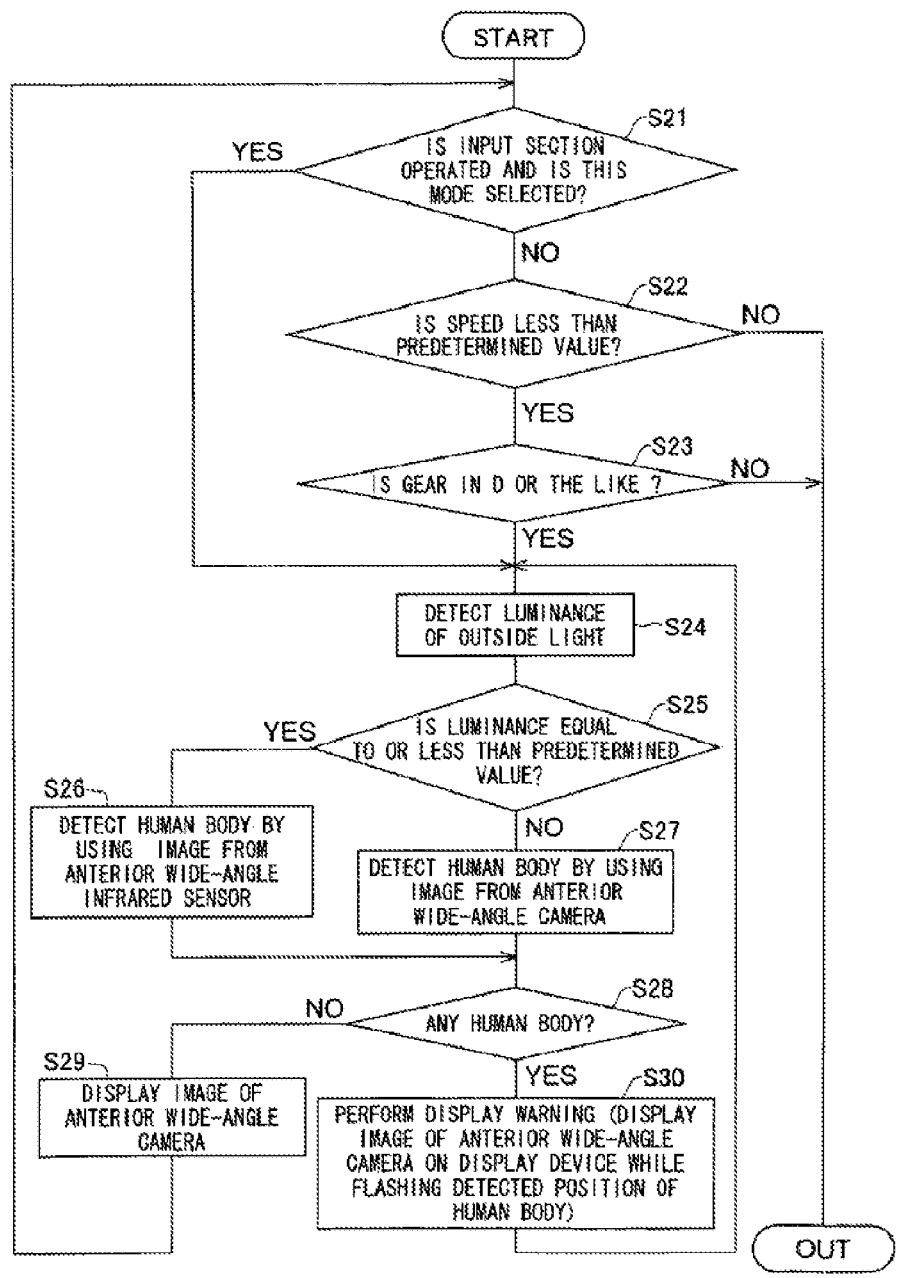
FIG. 9 illustrates an embodiment of the present invention, and is a flow chart illustrating a flow of a process for detecting a human body.

The flow of the process of this pedestrian warning display mode will be explained below with reference to the flowchart shown in FIG. 9.

First, the controlling device 100 judges whether this mode, namely, the pedestrian warning display mode is selected or not (step S21). Here, when the pedestrian warning display mode is selected, the process goes to step S24.

When the pedestrian warning display mode is not selected in step S21, the controlling device 100 judges whether the speed detected by the speed sensor 7 is less than a predetermined speed value or not (step S22). Here, the predetermined speed value is 10 Km/h for example. In the case of being equal to or more than the predetermined speed value, it is desirable to display in the normal display mode. Therefore, if the pedestrian warning display mode is not selected, the process is finished.

On the other hand, when the controlling device 100 judges in step S22 that the speed is less than a predetermined speed value, the controlling device 100 judges whether a gear is in one used for traveling, such as "D" (other than P gear or N gear), by use of the gear detection sensor 6 (step S23). Here, when the controlling device 100 judges that the gear is not in one for traveling, it is not necessary to display in the pedestrian warning display mode, because the automobile cannot travel. Namely, the case where the speed is less than the predetermined speed value and the gear other than one used for traveling such as D is selected is a so-called idling condition in which the automobile stops. In this case, with the display section 15, the driver may enjoy television received by the TV receiver 11 or images obtained by the reproducing device 22 reproducing a storage medium such as DVD (Digital Video Disc) or CD (Compact Disc), other than onboard storage medium (including at least both of the image storage section and the camera image storage section). In this case, it is preferable not to automatically select the pedestrian warning display mode, and therefore the controlling is carried out as the flowchart shows. On the contrary, there is a case where compulsory use of the pedestrian warning display mode is desired in traveling. According to the controlling according to the flowchart, the pedestrian warning display mode can be used in this case.

Further, when the gear is judged to be one for traveling such as D in step S 23, the process goes to step S 24.

In step S24, the luminance of the outside light is detected by the outside light luminance sensor 5.

And the controlling device 100 judges whether the detected luminance is less than a predetermined value or not (step S25). Note that the predetermined value is, for example, equal to or less than 100 lux. And when the detected luminance is judged to be equal to or less than the predetermined value, pedestrian (human body) detection is carried out on the basis of an image worked out from the detection result detected by the anterior wide-angle infrared sensor 4 (step S26). On the other hand, when the detected luminance is judged to be more than the predetermined value, the pedestrian (human body) detection is carried out on the basis of an image captured by the anterior wide-angle camera 3 (step S27).

The predetermined value (the predetermined value used in step S25) is influenced by a minimum illumination of the anterior wide-angle camera 3 and the detection limit in the case of detecting a human body by an outline of the human body. Therefore, it is necessary to change the predetermined value of the outside light luminance according to the minimum illumination and the detection limit obtained beforehand. Always using both the anterior wide-angle camera 3 and the anterior wide-angle infrared sensor 4 for detecting a human body makes it unnecessary to change the sensor in use according to the outside luminance, but in this case, there is a defect that throughput of the controlling device 100 including the pedestrian judging section 18 increases, resulting in slow processing speed.

Next, through human body detection processing in step S26 or step S27, the controlling device 100 judges whether a human body is detected or not (step S28). Here, when a human body is not detected, the image of the anterior wide-angle camera 3 is displayed on the second speed display area 102 (step S29) and the process goes to step S 21.

When a human body is detected in step S28, a warning display is performed in which the image of the anterior wide-angle camera 3 is displayed on the second speed display area 102 and at the same time the detected position of a human body is flashed (step S30). Because this warning display is carried out until the human body is out of the image capturing range of the anterior wide-angle camera 3, the process goes to step S24 and the human body detection process is repeated.

Here, as described above, the human body detection is carried out in two ways, and accordingly the display image on the second speed display area 102 of the display section 15 is different in each way.

Figure 10A:
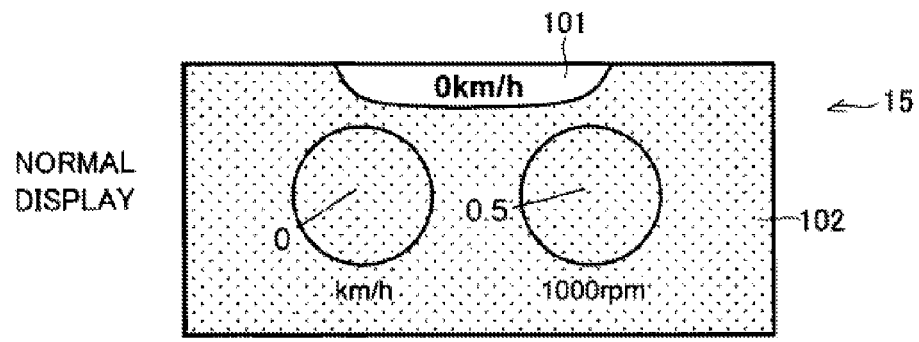
FIG. 10 (a) is a view illustrating a normal display mode and (b) is a view illustrating a pedestrian display mode.
Figure 10B:
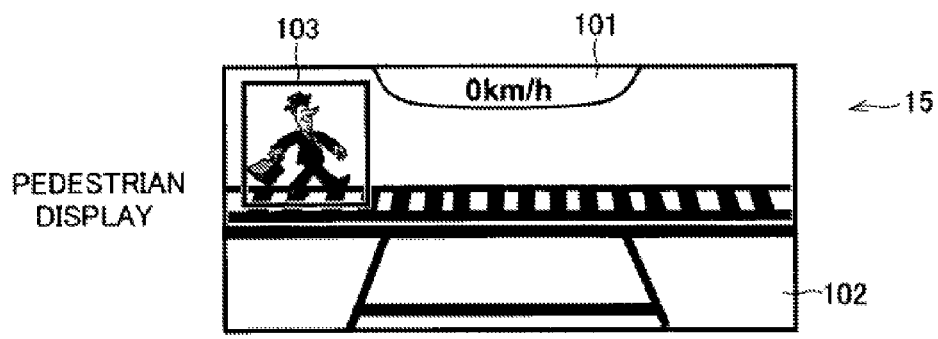

For example, when the outside luminance is larger than the predetermined value as illustrated in step S27, human body detection is carried out based on the image of the anterior wide-angle camera 3, and the pedestrian judging section makes processing for judging, on the basis of the image from the anterior wide-angle camera 3, whether it is a human body or not by use of pattern matching with shape characteristics of an outline or by use of the size of the outline as a parameter. When it is judged that a pedestrian exists, the controlling device 100 overlaps a pedestrian display area 103 on the coordinates where the pedestrian exists in the image obtained from the anterior wide-angle camera 3, and causes the display section 15 to display the warning display. The difference of the image screens at the time is illustrated in FIGS. 10. FIG. 10 illustrates how the display section 15 looks when changed from the normal display mode illustrated in FIG. 10 (*a*) to the pedestrian warning display mode illustrated in FIG. 10 (b). In this case, the second speed display area 102 displays in such a manner that the pedestrian is in the pedestrian display area 103, and the pedestrian display area 103 flashes. The situation shown in FIG. 10 (b) is assumed to be daytime or when it is as bright as daytime.

Figure 11A:
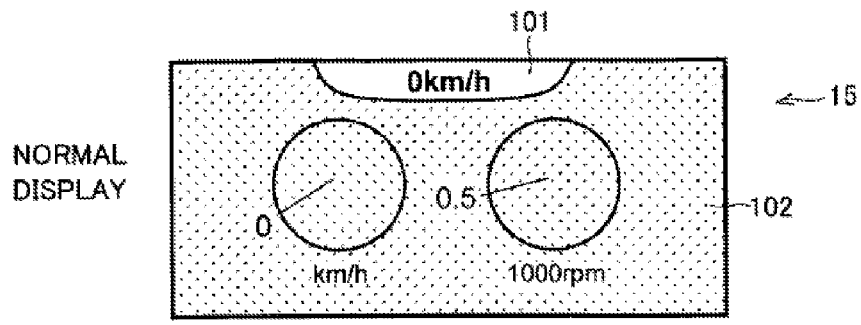
FIG. 11 (a) is a view illustrating a normal display mode and (b) is a view illustrating a pedestrian display mode (display by use of an infrared sensor).
Figure 11B:
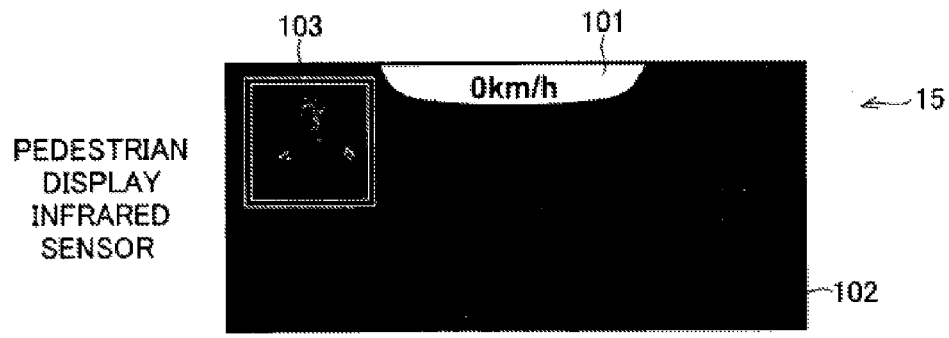

Further, when the outside luminance is smaller than the predetermined value as illustrated in step S26, a human body is detected from a signal of the anterior wide-angle infrared sensor 4, and the pedestrian judging section makes processing for judging, on the basis of the signal from the anterior wide-angle infrared sensor 4, whether it is a human body or not by use of pattern matching with shape characteristics of a thermal outline or by use of the size of the thermal outline as a parameter. When it is judged that a pedestrian exists, the controlling device 100 overlaps the pedestrian display area 103 on the coordinates where the pedestrian exists in the image from the anterior wide-angle camera 3, and causes the display section 15 to display the warning display. The difference of the image screens in this case is illustrated in FIGS. 11. FIG. 11 illustrate how the display section 15 looks when changed from the normal display mode illustrated in FIG. 11 (a) to the pedestrian warning display mode illustrated in 11 (b). In this case, as with the case of FIG. 10 (b), the second speed display area 102 displays the image from the anterior wide-angle camera 3 in such a manner that the pedestrian is in the pedestrian display area 103, and the pedestrian display area 103 flashes. The situation illustrated in FIG. 11 (b) is assumed to be nighttime or when it is as dark as nighttime.

As described above, it is possible for the driver to recognize a pedestrian with sure, regardless of whether it is day or night, and whether it is bright or dark, with the arrangement in which the pedestrian display area 103 surrounding the human body detected in the second speed display area 102, is flashed thereby to give warning. Therefore the safety of driving is further increased.

As described above, for the purpose of safe driving, it is necessary for a driver to comprehend traveling conditions with precision and to recognize a pedestrian with sure. In addition to that, psychological factors of the driver is indispensable for safe driving. For example, getting rid of the driver's worries allows safe driving.

For example, assume that the driver becomes worried because the driver places a baby or a pet on the rear seat, wants to know what condition it is in, and cannot check it. In this case, improvement in safety and mitigation of the driver's worries can be achieved by making it possible for the driver to check a worried subject without looking back to it while driving or stopping. Further, making it possible to check whether needful baggage is loaded in a trunk allows mitigation of the driver's worries.

As a method for realizing them, there is a method for displaying, on the second speed display area 102 of the display section 15, the image captured by the trunk camera 1 and the in-vehicle camera 2, as illustrated in FIG. 4.

Figure 12A:
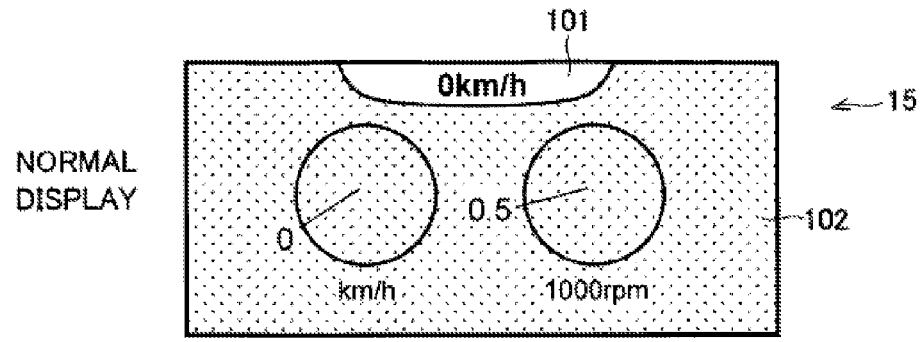
FIG. 12 (a) is a view illustrating a normal display mode and (b) is a view illustrating a rear seat display mode.
Figure 12B:
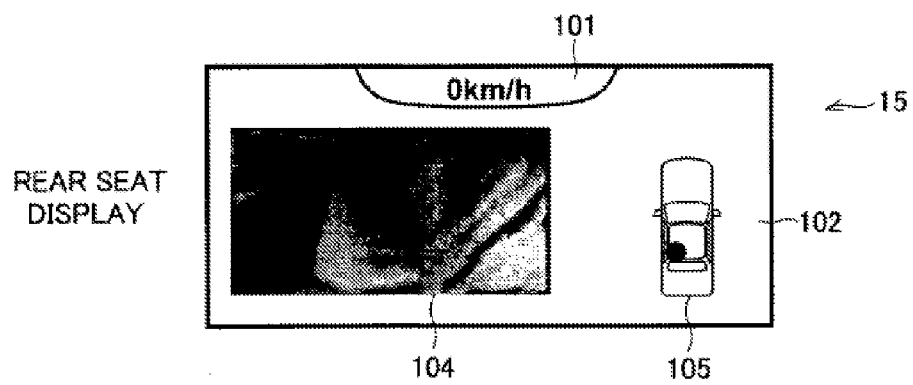

For example, there is a method for operating the input section 9 so as to switch from the normal display mode illustrated in FIG. 12 (a) to a rear seat display mode illustrated in FIG. 12 (b) and operate the in-vehicle camera 2. In this case, the second speed display area 102 forms both the third display area 104 for displaying the rear seat and the functioning camera display area 105 for indicating which of the in-vehicle cameras 2 now functions, and the functioning camera display area 105 displays a figure schematically illustrating a position, an image of which the functioning in-vehicle camera 2 and/or trunk camera 1 captures.

Figure 13A:
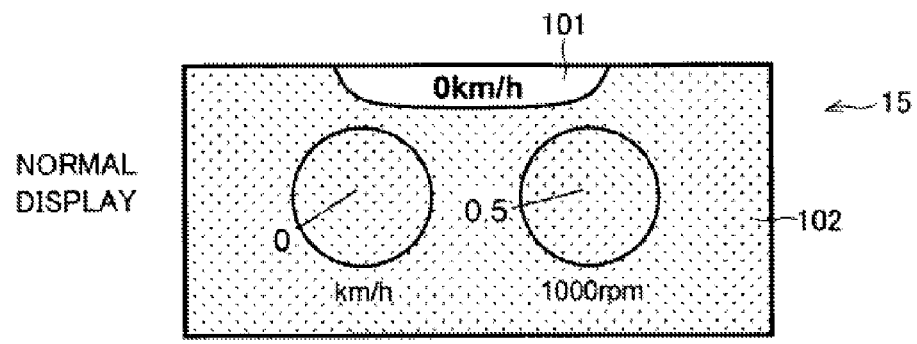
FIG. 13 (a) is a view illustrating a normal display mode and (b) is a view illustrating a trunk display mode.
Figure 13B:
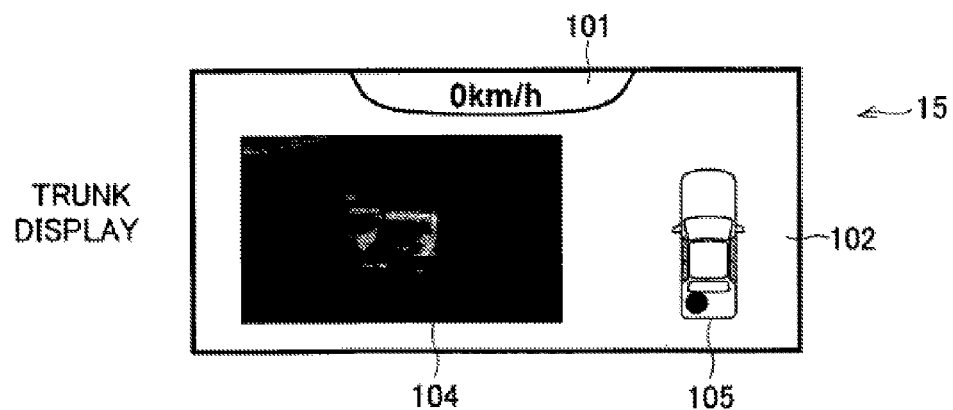

Further, there is a method for operating the input section 9 so as to switch from the normal display mode illustrated in FIG. 13 (a) to a trunk display mode illustrated in FIG. 13 (b) and operate the trunk camera 1. In this case, the second speed display area 102 forms both the third display area 104 for displaying inside the trunk and the functioning camera display area 105 for indicating which of the trunk cameras 1 now functions, and the functioning camera display area 105 displays a figure schematically illustrating a position, an image of which the functioning in-vehicle camera 2 and/or trunk camera 1 captures.

The function of the trunk camera 1 and the in-vehicle camera 2 can be switched by the driver operating the input section 9 according to necessity, so that the driver can display the inside of the automobile or the trunk and check it. As a result, driver's worries in driving can be removed and thereby safety of driving can be maintained.

Figure 14A:
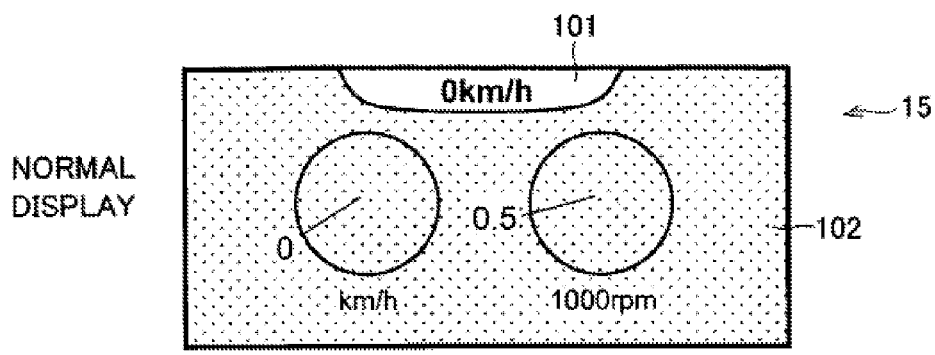
FIG. 14 (a) is a view illustrating a normal display mode and (b) is a view illustrating a "show-all" display mode.
Figure 14B:
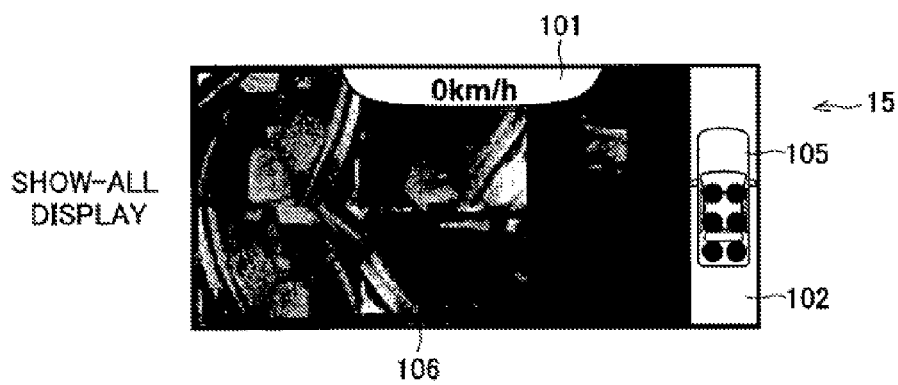

Further, there is a method for switching from the normal display mode illustrated in FIG. 14 (a) to a "show-all" display mode illustrated in FIG. 14 (b), by operating all the trunk cameras 1 and in-vehicle cameras 2. In this case, the second speed display area 102 forms both the third display area 104 for making "show-all" display and the functioning camera display area 105 for indicating which of the trunk cameras 1 and in-vehicle cameras 2 now functions, and the functioning camera display area 105 displays a figure schematically illustrating positions, images of which all the in-vehicle cameras 2 and/or the trunk cameras 1 capture. Here, the case of operating all the trunk cameras 1 and in-vehicle cameras 2 is described, but the operation is not limited to this case, and it may operate a plurality of the trunk cameras 1 and/or in-vehicle cameras 2 and make "show-all" display.

Making "show-all" display in this way allows the driver to check a plurality of positions simultaneously and easily comprehend which position of the automobile interior or the trunk is photographed, with a result that the driver can easily comprehend the situation. Particularly, this arrangement in which all the trunk cameras 1 and in-vehicle cameras 2 are operated and the "show-all" display is performed is preferable, because this arrangement allows the driver to easily comprehend the whole interior without making an operation for switching cameras.

In the present embodiment, the size of the display screen of the display section 15 is not particularly limited, but it is preferable that the second speed display area 102 for displaying information other than speed have a larger display area than the first speed display area 101 for displaying speed. The reason is that when speed is displayed on the first speed display area 101, displaying the speed digitally allows the driver to easily recognize the speed even if the display area is small to same extent. Further, a larger display area of the second speed display area 102 is preferable. The reason is that a larger display area makes recognition of display easier.

Further, it is preferable that the second speed display area 102 be oblong, with its aspect ratio being 7:3 or more, the aspect ratio being the width/height ratio of a display area. The reason is that the aspect ratio of 7:3 or more makes the front image on the second speed display area 102 oblong and wide, so that the driver can recognize a crossing pedestrian (human body) surely.

As described above, the present display system for a vehicle includes a display device having plural speed display areas, which are capable of being caused to display simultaneously, and a display controlling device for causing predetermined one of the plural display areas, to display speed and for causing other one or more of the plural speed display areas to display information other than the speed according to necessity. With the present display system, false recognition of the speed that is important information for safe driving is reduced and safety of user's driving is improved.

The present invention is not limited to the embodiment, and a variety of modifications are possible within the scope of the following claims. Namely, embodiments gained by combining technical means modified within the scope of the following claims are also within the technical range of the present invention.

The display system of the present invention for a vehicle is preferably used for not only automobiles as vehicles, but also other vehicles such as motorcycles and pedal cycles (e.g. bicycles), as long as the vehicles include a display device for simultaneously displaying plural speed display areas.

The invention claimed is:

1. A display system for a vehicle, comprising:
   a display device having plural speed display areas, which are arranged to display simultaneously;
   a display controlling device arranged to cause a predetermined one of said plural speed display areas to display speed and to cause another one or more of said plural speed display areas to display information other than the speed according to necessity;
   a front camera arranged to capture an image of a front area seen from said vehicle; and
   a human body detection section arranged to detect a human body in an image-capturing range of said front camera; wherein
   the display device is arranged to operate in a first display mode and a second display mode, the first display mode causes at least two of the plural speed display areas to display a speed of the vehicle, and the second display mode causes at least one of the plural speed display areas to display the speed of the vehicle and causes at least another one of the plural speed display areas to display information other than speed;
   the display controlling device is arranged to switch the display device between the first display mode and the second display mode in response to the necessity and is arranged to control the display device in only either the first display mode or the second display mode;
   the information other than the speed includes at least one of an image from a navigation device, a captured image from a camera disposed in the vehicle, an image from a storage medium included in the vehicle, an image which is stored in another storage medium and is outputted by a reproducing device included in the vehicle, the reproducing device reproducing the image from said another storage medium, an image for operation of an acoustic device included in the vehicle, an image for operation of an air-conditioning apparatus included in the vehicle, and an image received by a TV receiver;
   the display system performing the display in such a manner that, if an image displayed as the information other than the speed is a front image captured by said front camera, said display controlling device causes the detected human body to be displayed with emphasis when said human body detection section detects the human body in the front image; and
   said human body detection section includes a section arranged to detect a human body by detecting heat of a photographic subject in an image-capturing range of said front camera.

2. The display system for a vehicle as set forth in claim 1, wherein, when the speed and the information other than the speed are displayed respectively on said predetermined one and said another one or more of said speed display areas, said another one or more of said speed display areas is larger than said predetermined one of said speed display areas.

3. The display system for a vehicle as set forth in claim 1, wherein, when the speed and the information other than the speed are displayed respectively on said predetermined one and said another one or more of said speed display areas, the speed is displayed digitally.

4. The display system as set forth in claim 1, comprising:
   a speed detection section for detecting the speed of said vehicle;
   a steering angle detection section for detecting steering angle of said vehicle; and
   a background image storage section for storing therein a background image that is to be displayed on said speed display area, said display controlling device (i) reading out the background image from said background image storage section, (ii) causing the display device to display the background image, and (iii) scrolling the background image according to the speed detected by said speed detection section and to the steering angle detected by said steering angle detection section.

5. The display system as set forth in claim 1, comprising:
   a speed detection section for detecting the speed of said vehicle; and
   a steering angle detection section for detecting steering angle of said vehicle, the display system performing the display in such a manner that, when an image displayed as the information other than the speed is a front image being captured in a front area seen from the vehicle, said display controlling device moves a central position of the front image according to the steering angle detected by said steering angle detection section, and decides scroll speed of the front image according to the speed detected by said speed detection section.

6. The display system for a vehicle as set forth in claim 1, wherein said human body detection section detects a human body by use of outline information included in the front image captured by said front camera.

7. The display system for a vehicle as set forth in claim 1, comprising, in a case of said vehicle being an automobile, at least one of an in-vehicle camera for capturing an image of an inside of an automobile and a trunk camera for capturing an image of an inside of a trunk of the automobile,
   the display system performing the display in such a manner that, said display controlling device displays, as the information other than the speed, the image or images on the other one or more of said speed display areas displaying information other than speed, the image or images captured by said in-vehicle camera and/or trunk camera.

8. The display system as set forth in claim 7, wherein:
   a plurality of said in-vehicle cameras and/or said trunk cameras are provided; and
   said display device simultaneously displays all of the images captured by said plurality of said in-vehicle cameras and/or said trunk cameras.

9. The display system for a vehicle as set forth in claim 8, wherein:
   when said display controlling device causes the another one or more of said speed display areas to display, as the information other than the speed, the image captured by said in-vehicle cameras and/or said trunk cameras,
   said display controlling device displays information including a figure schematically indicating a position, an image of which said in-vehicle cameras and/or said trunk cameras captures.

10. The display system for a vehicle as set forth in claim 1, wherein the another one or more of said speed display areas are oblong, with their aspect ratios being 7:3 or more, the aspect ratios being a width/height ratio of a display area.

11. A vehicle including the display system for a vehicle as set forth in claim 1.

12. A display system for a vehicle, comprising:
a display device having plural speed display areas, which are arranged to display simultaneously;
a display controlling device arranged to cause at least two of said plural speed display areas to display speed and to cause another one or more of said plural speed display areas to display information other than the speed according to necessity;
a front camera arranged to capture an image of a front area seen from said vehicle; and
a human body detection section arranged to detect a human body in an image-capturing range of said front camera; wherein
the display device is arranged to operate in a first display mode and a second display mode, the first display mode causes at least two of the plural speed display areas to display a speed of the vehicle, and the second display mode causes at least one of the plural speed display areas to display the speed of the vehicle and causes at least another one of the plural speed display areas to display information other than speed;
the display controlling device is arranged to switch the display device between the first display mode and the second display mode in response to the necessity and is arranged to control the display device in only either the first display mode or the second display mode;
the information other than the speed includes at least one of an image from a navigation device, a captured image from a camera disposed in the vehicle, an image from a storage medium included in the vehicle, an image which is stored in another storage medium and is outputted by a reproducing device included in the vehicle, the reproducing device reproducing the image from said another storage medium, an image for operation of an acoustic device included in the vehicle, an image for operation of an air-conditioning apparatus included in the vehicle, and an image received by a TV receiver;
the display system performing the display in such a manner that, if an image displayed as the information other than the speed is a front image captured by said front camera, said display controlling device causes the detected human body to be displayed with emphasis when said human body detection section detects the human body in the front image; and
said human body detection section includes a section arranged to detect a human body by detecting heat of a photographic subject in an image-capturing range of said front camera.

13. The display system for a vehicle as set forth in claim 12, wherein, when the speed and the information other than the speed are displayed respectively on said predetermined at least two and said another one or more of said speed display areas, said another one or more of said speed display areas is larger than said predetermined at least two of said speed display areas.

14. The display system for a vehicle as set forth in claim 12, wherein, when the speed and the information other than the speed are displayed respectively on said predetermined at least two and said another one or more of said speed display areas, the speed is displayed digitally.

15. A display system for a vehicle, comprising:
a display device having plural speed display areas, which are arranged to display simultaneously;
a display controlling device arranged to cause a same one of said plural speed display areas to always display speed when the display device is displaying the speed, and to cause another one or more of said plural speed display areas to display information other than the speed according to necessity;
a front camera arranged to capture an image of a front area seen from said vehicle; and
a human body detection section arranged to detect a human body in an image-capturing range of said front camera; wherein
the display device is arranged to operate in a first display mode and a second display mode, the first display mode causes at least two of the plural speed display areas to display a speed of the vehicle, and the second display mode causes at least one of the plural speed display areas to display the speed of the vehicle and causes at least another one of the plural speed display areas to display information other than speed;
the display control device is arranged to switch the display device between the first display mode and the second display mode in response to the necessity and is arranged to control the display device in only either the first display mode or the second display mode;
the information other than the speed includes at least one of an image from a navigation device, a captured image from a camera disposed in the vehicle, an image from a storage medium included in the vehicle, an image which is stored in another storage medium and is outputted by a reproducing device included in the vehicle, the reproducing device reproducing the image from said another storage medium, an image for operation of an acoustic device included in the vehicle, an image for operation of an air-conditioning apparatus included in the vehicle, and an image received by a TV receiver
the display system performing the display in such a manner that, if an image displayed as the information other than the speed is a front image captured by said front camera, said display controlling device causes the detected human body to be displayed with emphasis when said human body detection section detects the human body in the front image; and
said human body detection section includes a section arranged to detect a human body by detecting heat of a photographic subject in an image-capturing range of said front camera.

16. The display system for a vehicle as set forth in claim 15, wherein, when the speed and the information other than the speed are displayed respectively on said predetermined same one and said another one or more of said speed display areas, said another one or more of said speed display areas is larger than said predetermined same one of said speed display areas.

17. The display system for a vehicle as set forth in claim 15, wherein, when the speed and the information other than the speed are displayed respectively on said predetermined same one and said another one or more of said speed display areas, the speed is displayed digitally.

18. A display system for a vehicle, comprising:
a display device having plural speed display areas, which are arranged to display simultaneously;
a display controlling device arranged to cause a predetermined one of said plural speed display areas to display speed and to cause another one or more of said plural speed display areas to display information other than the speed according to necessity; and at least one of an in-vehicle camera for capturing an image of an inside of an automobile and a trunk camera for capturing an image of an inside of a trunk of the automobile; wherein the display device is arranged to operate in a first display mode and a second display mode, the first display mode causes at least two of the plural speed display areas to display a speed of the vehicle, and the second display mode causes at least one of the plural speed display areas to display the speed of the vehicle and causes at least another one of the plural speed display areas to display information other than speed;

the display controlling device is arranged to switch the display device between the first display mode and the second display mode in response to the necessity and is arranged to control the display device in only either the first display mode or the second display mode;

the information other than the speed includes at least one of an image from a navigation device, a captured image from a camera disposed in the vehicle, an image from a storage medium included in the vehicle, an image which is stored in another storage medium and is outputted by a reproducing device included in the vehicle, the reproducing device reproducing the image from said another storage medium, an image for operation of an acoustic device included in the vehicle, an image for operation of an air-conditioning apparatus included in the vehicle, and an image received by a TV receiver;

the display system performing the display in such a manner that, said display controlling device displays, as the information other than the speed, the image or images on the other one or more of said speed display areas displaying information other than speed, the image or images captured by said in-vehicle camera and/or trunk camera;

a plurality of said in-vehicle cameras and/or said trunk cameras are provided; and said display device simultaneously displays all of the images captured by said plurality of said in-vehicle cameras and/or said trunk cameras.

19. A display system for a vehicle, comprising:

a display device having plural speed display areas, which are arranged to display simultaneously; and a display controlling device arranged to cause a same one of said plural speed display areas to always display speed when the display device is displaying the speed, and to cause another one or more of said plural speed display areas to display information other than the speed according to necessity;

at least one of an in-vehicle camera for capturing an image of an inside of an automobile and a trunk camera for capturing an image of an inside of a trunk of the automobile; wherein the display device is arranged to operate in a first display mode and a second display mode, the first display mode causes at least two of the plural speed display areas to display a speed of the vehicle, and the second display mode causes at least one of the plural speed display areas to display the speed of the vehicle and causes at least another one of the plural speed display areas to display information other than speed;

the display control device is arranged to switch the display device between the first display mode and the second display mode in response to the necessity and is arranged to control the display device in only either the first display mode or the second display mode;

the information other than the speed includes at least one of an image from a navigation device, a captured image from a camera disposed in the vehicle, an image from a storage medium included in the vehicle, an image which is stored in another storage medium and is outputted by a reproducing device included in the vehicle, the reproducing device reproducing the image from said another storage medium, an image for operation of an acoustic device included in the vehicle, an image for operation of an air-conditioning apparatus included in the vehicle, and an image received by a TV receiver;

the display system performing the display in such a manner that, said display controlling device displays, as the information other than the speed, the image or images on the other one or more of said speed display areas displaying information other than speed, the image or images captured by said in-vehicle camera and/or trunk camera;

a plurality of said in-vehicle cameras and/or said trunk cameras are provided; and said display device simultaneously displays all of the images captured by said plurality of said in-vehicle cameras and/or said trunk cameras.

* * * * *